(12) United States Patent
Lee

(10) Patent No.: US 8,139,914 B2
(45) Date of Patent: Mar. 20, 2012

(54) ENCLOSURE FOR HOUSING SPLICE TRAYS

(75) Inventor: Scott David Lee, Terrigal (AU)

(73) Assignee: ADC GmbH, Berlin (DE)

( * ) Notice: Subject to any disclaimer, the term of this patent is extended or adjusted under 35 U.S.C. 154(b) by 169 days.

(21) Appl. No.: 12/607,647

(22) Filed: Oct. 28, 2009

(65) Prior Publication Data

US 2010/0111485 A1    May 6, 2010

(30) Foreign Application Priority Data

Oct. 28, 2008    (AU) ................................ 2008905565

(51) Int. Cl.
  *G02B 6/00* (2006.01)

(52) U.S. Cl. ...................................... 385/135; 385/134

(58) Field of Classification Search ................ 385/134, 385/135, 136, 137, 95, 96, 97, 98, 99
See application file for complete search history.

(56) References Cited

U.S. PATENT DOCUMENTS

| | | | | |
|---|---|---|---|---|
| 5,870,519 A * | 2/1999 | Jenkins et al. | ................ | 385/135 |
| 6,188,826 B1 * | 2/2001 | Daoud | ................ | 385/135 |
| 6,304,707 B1 * | 10/2001 | Daems et al. | ................ | 385/135 |
| 6,504,987 B1 * | 1/2003 | Macken et al. | ................ | 385/135 |
| 7,496,269 B1 | 2/2009 | Lee | ................ | 385/135 |
| 7,522,805 B2 | 4/2009 | Smith et al. | ................ | 385/135 |
| 2010/0111485 A1 * | 5/2010 | Lee | ................ | 385/135 |

OTHER PUBLICATIONS

Brochure: ADC Telecommunications. FL1000 Customer Premises Fiber Distribution Products. pp. 1-8. 1998.
Brochure: ADC Telecommunications: Fiber Panel Products Second Edition. pp. 1-111. 1994.
Brochure: ADC Telecommunications: FL2000 Products. pp. 1-48. 1994.

* cited by examiner

*Primary Examiner* — Brian Healy
(74) *Attorney, Agent, or Firm* — Merchant & Gould P.C.

(57) ABSTRACT

An enclosure for housing splice trays, including a convex bracket extending between two internal sections of the enclosure, the bracket having a track extending at least partially between said sections of the enclosure, wherein the splice trays are couplable to and translatable along the track.

22 Claims, 3 Drawing Sheets

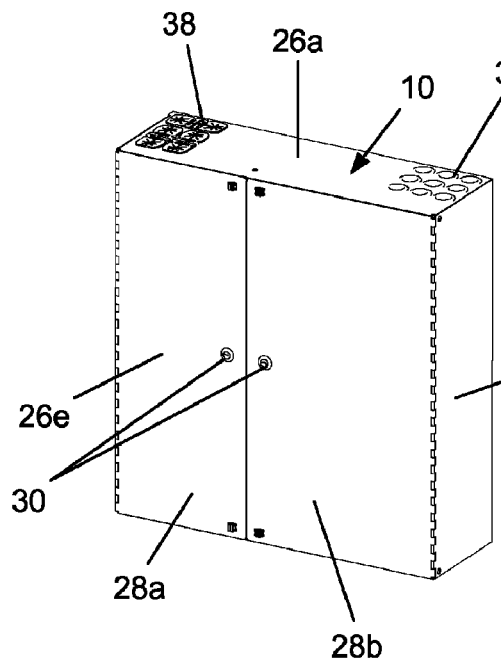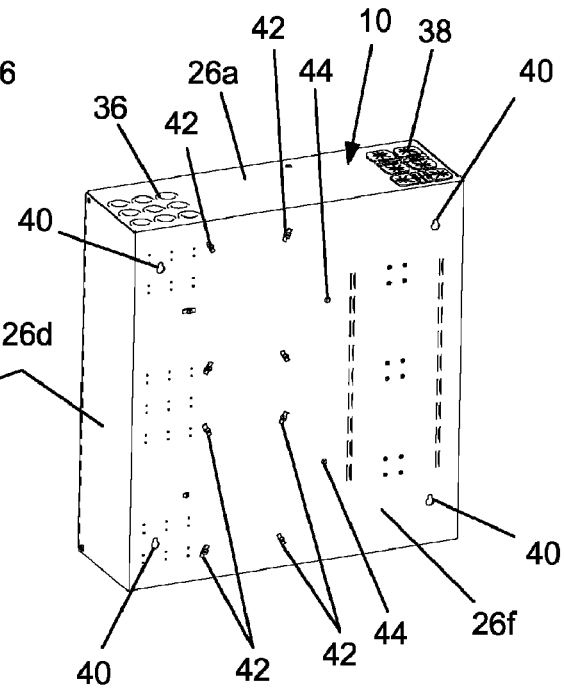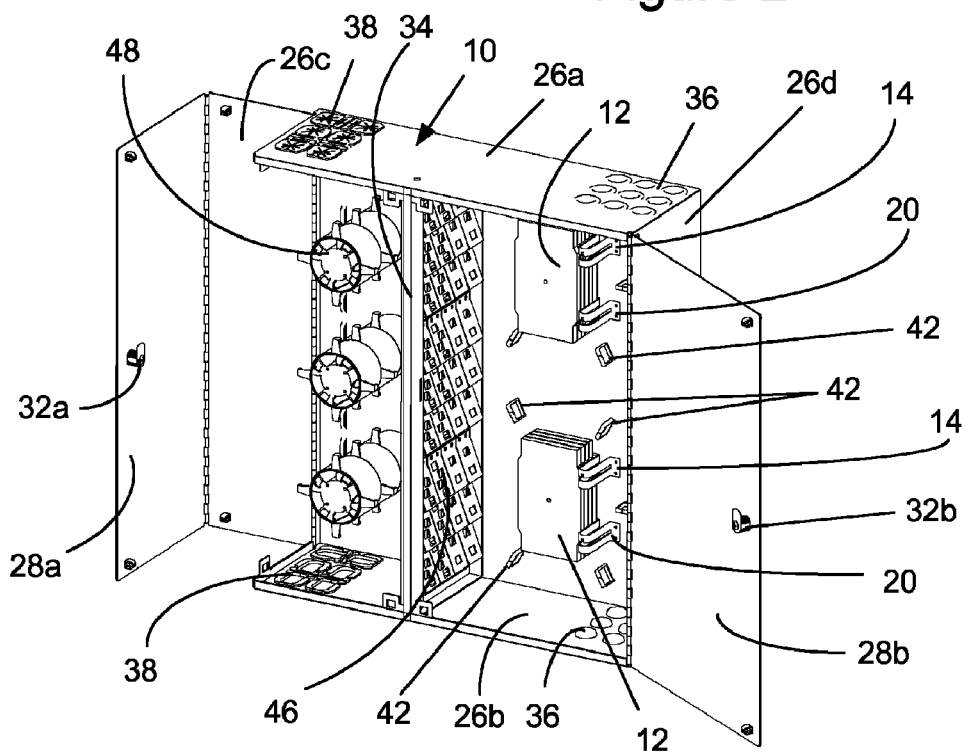

ENCLOSURE FOR HOUSING SPLICE TRAYS

This application claims benefit of Serial No. 2008905565, filed 28 Oct. 2008 in Australia and which application is incorporated herein by reference. To the extent appropriate, a claim of priority is made to the above disclosed application.

FIELD OF THE INVENTION

The present invention relates to an enclosure for housing splice trays. For example, the invention relates to an enclosure for the safe containment of cables such as optical fibers.

BACKGROUND OF THE INVENTION

The process of binding together two ends of an optical fiber is known as splicing, resulting in a "splice" being created between the two fibers. Splices are particularly susceptible to damage from mechanical disturbances such as shock, stress, dynamic loading and the like. Modern optical fiber networks can contain cables comprising hundreds of optical fibers and a correspondingly large number of individual splices each of which needs to be protected against the aforementioned mechanical disturbances.

Splice trays have previously been developed for the containment of optical fibers and cables. Splice trays may be useful in protecting optical fibers and cables against undesirable mechanical disturbances. However, handling difficulties may arise during the placement of new cables into splice trays, for example, where multiple splice trays are collocated.

In an office, for example, multiple splice trays are generally arranged in a single enclosure, such as a cabinet, for ordinance and protection. Arranging the splice trays in such a way can make it difficult to properly access any one particular splice tray if new connections, or maintenance of existing connections, is desired.

It is generally desirable to overcome or ameliorate one or more of the above described difficulties of known splice tray enclosures, or to at least provide a useful alternative.

SUMMARY OF THE INVENTION

In accordance with one aspect of the present invention, there is provided an enclosure for housing splice trays, including a convex bracket extending between two internal sections of the enclosure, the bracket having a track extending at least partially between said sections of the enclosure, wherein the splice trays are couplable to and translatable along the track.

The bracket preferably includes a splice tray connection section. The splice tray connection section is preferably shaped to receive a connection member of a splice tray and to locate the connection member for engagement with the track. The track is preferably an elongate slot extending along an outer peripheral surface of the bracket between said sections of the enclosure. The splice tray connection section is preferably a slot that opens into the track. Preferably, a splice tray is coupled to the bracket when the connection member is seated in the track. Preferably, the connection member is adapted to translate along the track.

Preferably, the enclosure includes another corresponding convex bracket extending between two internal sections of the enclosure, said another bracket having a track extending at least partially between said sections of the enclosure, wherein the splice trays are couplable to and translatable along the track of said bracket and the track of said another bracket.

The corresponding bracket preferably, includes a splice tray connection section. The splice tray connection section of said another bracket is preferably shaped to receive another connection member of a splice tray and to locate the connection member for engagement with the track. The track of said another bracket is preferably an elongate slot extending along an outer peripheral surface of the bracket between said sections of the enclosure. The splice tray connection section of said another bracket is preferably a slot that opens into the track.

In accordance with another aspect of the invention, there is provided a splice tray for use in the above described enclosure, wherein the splice tray has an "L" shaped connection member extending laterally from an end of the splice tray, the connection member being shaped for engagement with a track of a bracket of the enclosure.

In accordance with another aspect of the invention, there is provided a splice tray for use in the above described enclosure, including a coupling bracket having an "L" shaped connection member for engagement with a track of a bracket of the enclosure.

In accordance with another aspect of the invention, there is provided a splice tray for use in the above described enclosure, including a coupling bracket having two "L" shaped connection members arranged for respective engagement with the track of said bracket and the track of said another bracket of the enclosure.

BRIEF DESCRIPTION OF THE DRAWINGS

Preferred embodiment of the invention will be further described, by way of non-limiting example only, with reference to the accompanying drawings, in which:

FIG. 1 is a front perspective view of an enclosure;

FIG. 2 is a rear perspective view of the enclosure shown in FIG. 1;

FIG. 3 is a front perspective view of the enclosure shown in FIG. 1 arranged in an open condition of use;

DETAILED DESCRIPTION OF PREFERRED EMBODIMENTS OF THE INVENTION

Figure 4:
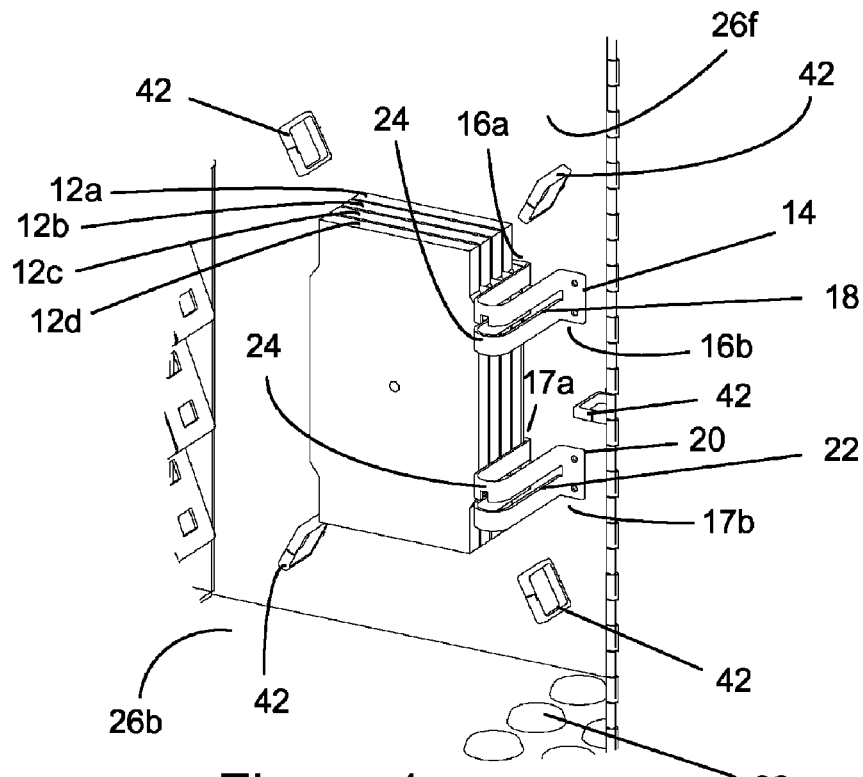
FIG. 4 is an enlarged view of a splice tray mounted within the enclosure shown in FIG. 3.

The enclosure 10 shown in FIGS. 1 to 3 is used to house splice trays 12. As particularly shown in FIGS. 4 and 5, the enclosure 10 includes a convex bracket 14 extending between two internal sections 16a, 16b of the enclosure 10. The bracket 14 has a track 18 extending at least partially between the mentioned sections 16a, 16b of the enclosure 10. The splice trays 12a, 12b, 12c, 12d are couplable to, and translatable, along the track 18. The enclosure 10 also includes another corresponding convex bracket 20 extending between two internal sections 17a, 17b of the enclosure 10. The corresponding bracket 20 has a track 22 extending at least partially between the mentioned sections 17a, 17b of the enclosure 10. The splice trays 12a, 12b, 12c, 12d are couplable to, and translatable along, the track 18 of the first bracket 14 and the track 22 of the other corresponding bracket 20. Apexes 24 of the two convex brackets 14, 20 are preferably in vertical alignment.

The brackets 14, 20 couple the splice trays 12a, 12b, 12c, 12d to the enclosure 10 in a manner that facilitates stacking of the trays 12a, 12b, 12c, 12d against the back wall 26f in the manner shown in FIG. 4, for example. In this arrangement, multiple splice trays 12a, 12b, 12c, 12d are neatly stacked on a common side of the brackets 14, 20 in an organised manner. Access to individual splice trays 12a, 12b, 12c, 12d can be obtained by sliding the splice trays 12 from one side of the brackets 14, 20 to the other along the tracks 18, 22. For example, access to the splice stray 12c can be gained by sliding the splice tray 12d stacked in front of it along the tracks 18, 22 of the brackets 14, 20 towards to the other side of the brackets 14, 20 in the manner shown in FIG. 5.

The enclosure 10 is a generally rectangular cabinet defined by top 26a, bottom 26b, left side 26c, right side 26d, front 26e and back 26f sides. The front side 26e of the enclosure 10 includes two hinged doors 28a, 28b that open outwardly in the manner shown in FIG. 3 so as to lay open the contents of the enclosure 10. The left side 26c and the left door 28a are preferably coupled together by a hinge for improved access to the contents of the enclosure 10.

The hinged doors 28a, 28b each include a handle 30 having a locking device 32a, 32b operable with a central post 34 inside the enclosure 10. The locking devices 32a, 32b securely close the doors 28a, 28b of the enclosure 10. The locking devices 32a, 32b are preferably operable to open and close the doors 28a, 28b with use of a key.

Enclosure 10 includes a plurality of openings 36 for cable entry and a plurality of openings 38 for cable exit. Openings 36 and 38 may be provided on either the top 26a or bottom 26b of the enclosure 10 or both. Openings 36 and 38 may be partially formed to allow a user to 'punch out' the required openings, or alternatively, openings 36 and 38 may be covered with removable inserts to allow access when desired. The enclosure 10 preferably includes a reduced number of cavities open to the surrounding environment, thereby reducing entry of unwanted contaminants.

Apertures 40 are provided in rear wall 26d to enable enclosure 10 to be fixedly attached to a surface, for example a wall. Cable management clips 42 are provided inside enclosure 10 to secure slack fiber cable inside enclosure 10.

In use, cable (not shown) enters enclosure 10 through openings 36 and is then attached to splice tray 12 where splicing occurs using known splicing techniques. Cables are wrapped around the cable management devices 42 which are used to secure the cables to the inside of enclosure 10. After splicing, the cable exits the splice tray 12 in the form of splitter output cables that are then connected to connector panel 46 to enable connection to individual devices. Individual cables are would around cable organisers 48 to arrange outgoing cable, which then exits through cable exit opening 38.

Figure 6:
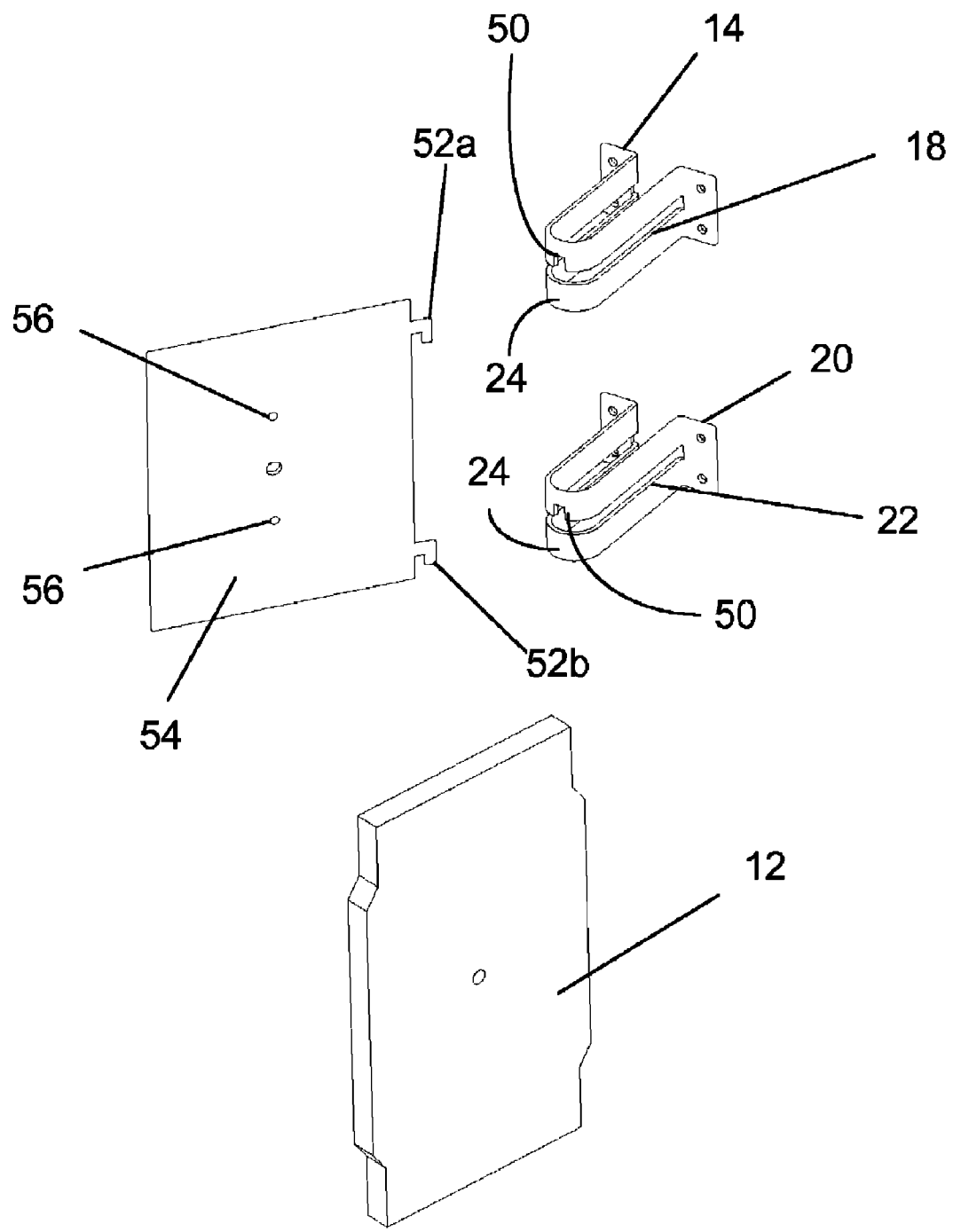
FIG. 6 is an exploded perspective view of a splice tray, backing plate and fastener of the enclosure shown in FIG. 1.

As particularly shown in FIG. 6, each bracket 14, 20 includes a splice tray connection section 50 which is shaped to receive connection members 52a, 52b of a splice tray 12 and to locate the connection members 52a, 52b for engagement with respective tracks 18, 22. The tracks 18, 22 of each bracket 14, 20 are preferably elongate slots extending along outer peripheral surfaces of the brackets 14, 20. The splice tray connection sections 50 are preferably slots that open into respective tracks 18, 22. The connection members 52a, 52b are adapted to translate along the tracks 18, 22.

A splice tray 12 is coupled to the enclosure 10 by performing the following steps a. Aligning the connection members 52a, 52b of the splice tray 12 with corresponding connection sections 50 located at the apexes 24 of the brackets 14, 20;

b. Inserting the connection members into corresponding connection sections 50 of the brackets 14, 20; and c. Sliding the splice tray 12 along the tracks 18, 22 of the brackets 14, 20 from the apexes 24 to a desired location.

These steps are performed in reverse to remove a splice tray 12 from the enclosure 10.

The splice tray 12 includes a coupling bracket 54 couplable to a side of the splice tray 12 by fasteners (not shown) extending through apertures 56. The connection members 52a, 52b are preferably "L" shaped lugs extending in laterally from opposite an ends of the coupling bracket 54. The connection members 52a, 52b are spaced apart a sufficient distance for insertion into corresponding connections sections 50 of the brackets 14, 20. The downwardly projecting "L" shaped lugs 52a, 52b are seated in the tracks 18, 22 of the brackets 14, 20 when connected in the above described manner. The lugs 52a, 52b are adapted to slide along the tracks 18, 22.

The connection members 52a, 52b are, alternatively, "L" shaped lugs formed integrally with the splice tray 12. The connection members 52a, 52b extend laterally from opposite an ends of the splice tray 12. The connection members 52a, 52b are spaced apart a sufficient distance for insertion into corresponding connections sections 50 of the brackets 14, 20. The downwardly projecting "L" shaped lugs 52a, 52b are seated in the tracks 18, 22 of the brackets 14, 20 when connected in the above described manner. The lugs 52a, 52b are adapted to slide along the tracks 18, 22.

The splice trays 12 are preferably any suitable commonly available splice trays adapted to engage with brackets 14, 20.

Figure 5:
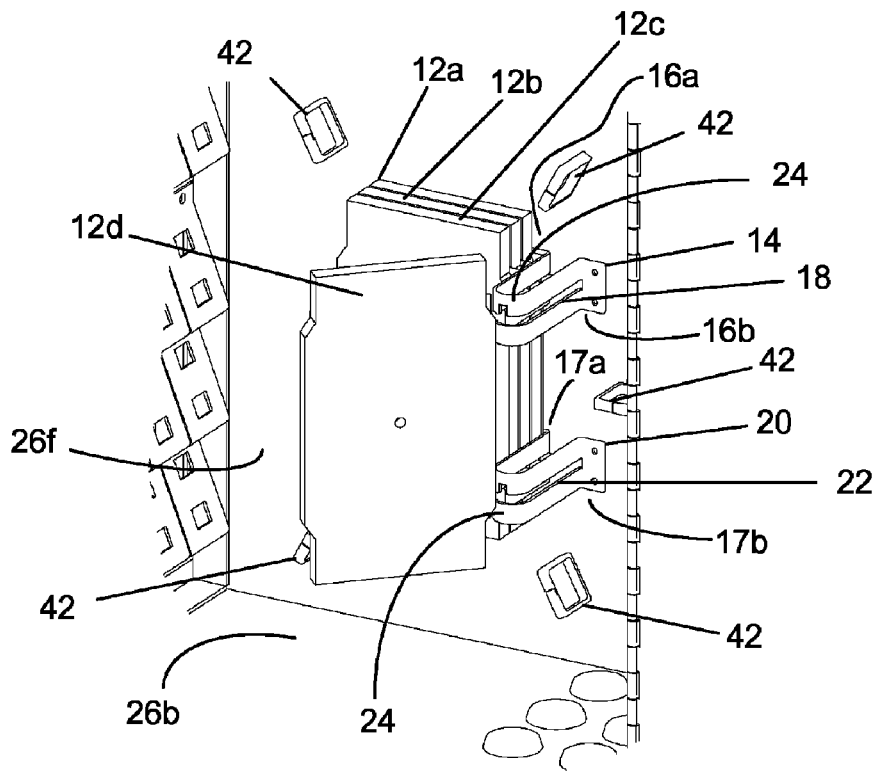
FIG. 5 is a perspective view of the splice tray shown in FIG. 4 arranged in another condition of use.

As particularly shown in FIGS. 4 and 5, the brackets 14, 20 are fixedly attached to rear wall 26f of enclosure 10 using rivets. However, the brackets 14, 20 could, alternatively, be coupled to the read wall 26f of the enclosure by any other suitable means. The 14, 20 could also be formed integrally with the rear wall 26f.

In the embodiment shown, the enclosure includes two brackets 14, 20. Alternatively, the fastener includes any number of brackets. In the embodiment shown, brackets 14, 20 are made from steel and pressed into a shape which is substantially 'U' shaped. Alternatively, the brackets 14, 20 are formed in any other suitable shape that provides a track 18, 22 along which a splice tray 12 can travel. Brackets 14, 20 may also be made from any other material using commonly available manufacturing techniques, for example moulded plastic.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF PARTS

10 Enclosure
12 Splice tray
14 Bracket
16a, 16b Section of enclosure
17a, 17b Section of enclosure
18 Track
20 Bracket
22 Track 24 Apex of bracket
26a, 26b Top and bottom panels enclosure
26c, 26d Left and right panels of enclosure
26e, 26f Front and back panels of enclosure
28a, 28b Door of enclosure
30 Handle
32a, 32b Locking device
34 Central post
36 Opening for cable entry
38 Opening for cable exit
40 Aperture
42 Cable management clip
44 Aperture
46 Connector panel
48 Cable organiser
50 Splice tray Connection section
52a, 52b Connection member
54 Coupling bracket
56 Aperture

The invention claimed is:

1. An enclosure for housing splice trays, comprising:
an enclosure body,
a plurality of splice trays, and
a convex bracket extending between two internal sections of the enclosure, the bracket having a track extending at least partially between said sections of the enclosure body, wherein the splice trays are couplable to and translatable along the track.

2. The enclosure claimed in claim 1, wherein the bracket includes a splice tray connection section.

3. The enclosure claimed in claim 2, wherein the splice tray connection section is shaped to receive a connection member of a splice tray and to locate the connection member for engagement with the track.

4. The enclosure claimed in claim 3, wherein the track is an elongate slot extending along an outer peripheral surface of the bracket between said sections of the enclosure body.

5. The enclosure claimed in claim 4, wherein the splice tray connection section is a slot that opens into the track.

6. The enclosure claimed in claim 5, wherein a splice tray is coupled to the bracket when the connection member is seated in the track.

7. The enclosure claimed in claim 6, wherein the connection member is adapted to translate along the track.

8. The enclosure claimed in claim 7, wherein the connection member is an L-shaped lug extending laterally from an end of the splice tray.

9. The enclosure claimed in claim 7, wherein the connection member is an L-shaped lug extending laterally from a coupling bracket coupled to the splice tray.

10. The enclosure claimed in claim 1, including another corresponding convex bracket extending between two internal sections of the enclosure body, the bracket and the another bracket forming a fastener, said another bracket having a track extending at least partially between said sections of the enclosure body, wherein the splice trays are couplable to and translatable along the track of said bracket and the track of said another bracket.

11. The enclosure claimed in claim 10, wherein said another bracket includes a splice tray connection section.

12. The enclosure claimed in claim 11, wherein the splice tray connection section of said another bracket is shaped to receive another connection member of a splice tray and to locate the connection member for engagement with the track.

13. The enclosure claimed in claim 12, wherein the track of said another bracket is an elongate slot extending along an outer peripheral surface of the bracket between said sections of the enclosure body.

14. The enclosure claimed in claim 13, wherein the splice tray connection section of said another bracket is a slot that opens into the track.

15. The enclosure claimed in claim 14, wherein a splice tray is coupled to the fastener when a first connection member of the splice tray is seated in the track of said bracket and a second connection member of the splice tray is seated in the track of said another bracket.

16. The enclosure claimed in claim 15, wherein the first connection member and the second connection member are adapted to translate along respective tracks of said bracket and said another bracket.

17. The enclosure claimed in claim 14, wherein the first connection member is an L-shaped lug extending laterally from an end of the splice tray and the second connection member is an L-shaped member extending laterally from another end of the splice tray.

18. The enclosure claimed in claim 15, wherein the first connection member is an L-shaped lug extending from a coupling bracket coupled to the splice tray and the second connection member is an L-shaped lug extending from the coupling bracket.

19. The enclosure claimed in claim 10, wherein said bracket and said another bracket are vertically aligned.

20. The splice tray for use in an enclosure, comprising: a splice tray body, wherein the splice tray body has an L-shaped connection member extending laterally from an end of the splice tray body, the connection member being shaped for engagement with a track of a bracket of the enclosure.

21. A splice tray for use in an enclosure comprising; a splice tray and a coupling bracket having an L-shaped connection member for engagement with a track of a bracket of the enclosure.

22. A splice tray for use in an enclosure, comprising: a splice tray and a coupling bracket having two L-shaped connection members arranged for respective engagement with a first track of a first bracket and a second track of a second bracket of the enclosure.

* * * * *